United States Patent
Berke et al.

(10) Patent No.: US 9,612,638 B1
(45) Date of Patent: Apr. 4, 2017

(54) SYSTEMS AND METHODS FOR AUTOMATIC DETECTION AND CONFIGURATION OF VOLTAGE REGULATOR PHASES IN A MULTI-RAIL VOLTAGE REGULATOR

(71) Applicant: Dell Products L.P., Round Rock, TX (US)

(72) Inventors: Stuart Allen Berke, Austin, TX (US); Abey K. Mathew, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/004,294

(22) Filed: Jan. 22, 2016

(51) Int. Cl.
*G06F 1/26* (2006.01)
*G06F 1/28* (2006.01)

(52) U.S. Cl.
CPC . *G06F 1/26* (2013.01); *G06F 1/28* (2013.01)

(58) Field of Classification Search
CPC .................................... G06F 1/26; G06F 1/28
See application file for complete search history.

(56) References Cited

U.S. PATENT DOCUMENTS

| | | | | |
|---|---|---|---|---|
| 8,063,619 B2* | 11/2011 | Zhu | ........................... | H02J 7/32 323/266 |
| 2014/0108846 A1* | 4/2014 | Berke | ................. | G06F 13/4221 713/340 |
| 2014/0232420 A1* | 8/2014 | Luo | ..................... | H02M 3/1584 324/750.01 |
| 2016/0033611 A1* | 2/2016 | Rahardjo | ............. | G01R 35/005 702/104 |
| 2016/0233766 A1* | 8/2016 | Todorov | .............. | H02M 3/1584 |

* cited by examiner

*Primary Examiner* — Stefan Stoynov
(74) *Attorney, Agent, or Firm* — Jackson Walker L.L.P.

(57) ABSTRACT

A method may include, in an information handling system comprising a power system having a plurality of voltage regulator phases, during a configuration mode of the power system, determining connectivity between the plurality of voltage regulator phases and a primary power rail and connectivity between the plurality of voltage regulator phases and a secondary power rail based on population of output inductors in one or more of a plurality of first phase output inductor footprint locations or one or more of a plurality of second phase output inductor footprint locations, wherein each of the plurality of phase output inductor footprint locations is respectively coupled to an first output of a respective voltage regulator phase of the plurality of voltage regulator phases and is coupled to a respective power rail of the information handling system.

18 Claims, 2 Drawing Sheets

SYSTEMS AND METHODS FOR AUTOMATIC DETECTION AND CONFIGURATION OF VOLTAGE REGULATOR PHASES IN A MULTI-RAIL VOLTAGE REGULATOR

TECHNICAL FIELD

The present disclosure relates in general to information handling systems, and more particularly to systems and methods for providing a multi-rail voltage regulator with a configurable phase allocation.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may include a voltage regulator to provide a constant voltage level and a current to power the system. For example, a voltage regulator may receive an input voltage and produce an output current at a predetermined output voltage required by a load, i.e., the circuit element(s) for which it is providing power. Many voltage regulators may be capable of operating in multiple phases, wherein a phase for a voltage regulator may typically refer to combining a driver and a power stage to form one phase. Thus, a multi-phase voltage regulator may include multiple instances of such combinations.

Oftentimes, an information handling system may require multiple voltage rails to power components requiring different power supply voltages. Traditionally, such requirements have been satisfied by providing a stand-alone voltage regulator for each such rail. To enable many configurations of components within an information handling system, each voltage regulator would typically include a number of phases to ensure it can meet power requirements of the components to which power is supplied on each rail. Accordingly, in a configuration of components in which some do not require all of the phases of the voltage regulator providing power to such components, such phases may in a sense be "wasted," adding cost to and taking space up in an information handling system.

SUMMARY

In accordance with the teachings of the present disclosure, the disadvantages and problems associated with existing approaches to providing multiple power rails in an information handling system may be reduced or eliminated.

In accordance with embodiments of the present disclosure, an information handling system may include a processor and a power system. The power system may include a plurality of voltage regulator phases, a plurality of first phase output inductor footprint locations, a plurality of second phase output inductor footprint locations, and a power controller. Each of the plurality of voltage regulator phases may include at least two outputs comprising a first output and a second output. Each of the plurality of first phase output inductor footprint locations may be respectively coupled to the first output of a respective voltage regulator phase of the plurality of voltage regulator phases and is coupled to a primary power rail of the information handling system such that when populated with a respective output inductor, such first phase output inductor footprint location electrically couples the first output of the respective voltage regulator phase to the primary power rail. Each of the plurality of second phase output inductor footprint locations may be respectively coupled to the second output of a respective voltage regulator phase of the plurality of voltage regulator phases and is coupled to a secondary power rail of the information handling system such that when populated with a respective output inductor, such second phase output inductor footprint location electrically couples the second output of the respective voltage regulator phase to the secondary power rail. The power controller may be configured to, during a configuration mode of the power system, and based on population of output inductors in the first phase output inductor footprint locations and second phase output inductor footprint locations, determine connectivity between the plurality of voltage regulator phases and the primary power rail and connectivity between the plurality of voltage regulator phases and the secondary power rail.

In accordance with these and other embodiments of the present disclosure, a method may include, in an information handling system comprising a power system having a plurality of voltage regulator phases, during a configuration mode of the power system, determining connectivity between the plurality of voltage regulator phases and a primary power rail and connectivity between the plurality of voltage regulator phases and a secondary power rail. The connectivity may be based on population of output inductors in one or more of a plurality of first phase output inductor footprint locations wherein each of the plurality of first phase output inductor footprint locations is respectively coupled to a first output of a respective voltage regulator phase of the plurality of voltage regulator phases and is coupled to a primary power rail of the information handling system such that when populated with a respective output inductor, such first phase output inductor footprint location electrically couples the first output of the respective voltage regulator phase to the primary power rail and output inductors in one or more of a plurality of second phase output inductor footprint locations wherein each of the plurality of second phase output inductor footprint locations is respectively coupled to a second output of a respective voltage regulator phase of the plurality of voltage regulator phases and is coupled to a secondary power rail of the information handling system such that when populated with a respective output inductor, such second phase output inductor footprint location electrically couples the second output of the respective voltage regulator phase to the secondary power rail.

In accordance with these and other embodiments of the present disclosure, a power system may include a plurality of voltage regulator phases, a plurality of first phase output inductor footprint locations, a plurality of second phase output inductor footprint locations, and a power controller. Each of the plurality of voltage regulator phases may include at least two outputs comprising a first output and a second output. Each of the plurality of first phase output inductor footprint locations may be respectively coupled to the first output of a respective voltage regulator phase of the plurality of voltage regulator phases and is coupled to a primary power rail of the information handling system such that when populated with a respective output inductor, such first phase output inductor footprint location electrically couples the first output of the respective voltage regulator phase to the primary power rail. Each of the plurality of second phase output inductor footprint locations may be respectively coupled to the second output of a respective voltage regulator phase of the plurality of voltage regulator phases and is coupled to a secondary power rail of the information handling system such that when populated with a respective output inductor, such second phase output inductor footprint location electrically couples the second output of the respective voltage regulator phase to the secondary power rail. The power controller may be configured to, during a configuration mode of the power system, and based on population of output inductors in the first phase output inductor footprint locations and second phase output inductor footprint locations, determine connectivity between the plurality of voltage regulator phases and the primary power rail and connectivity between the plurality of voltage regulator phases and the secondary power rail.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
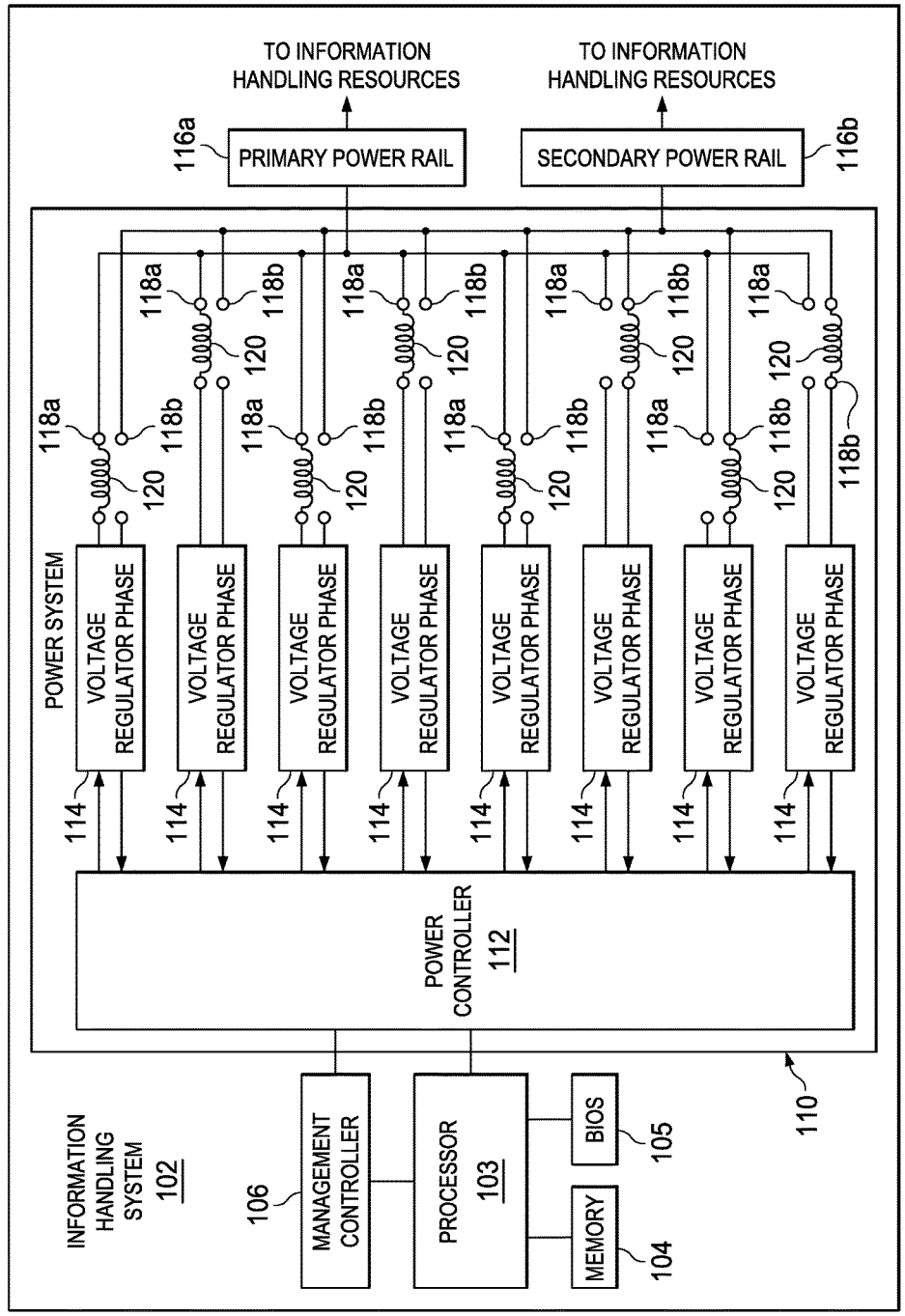
FIG. 1 illustrates a block diagram of an example information handling system, in accordance with embodiments of the present disclosure.
Figure 2:
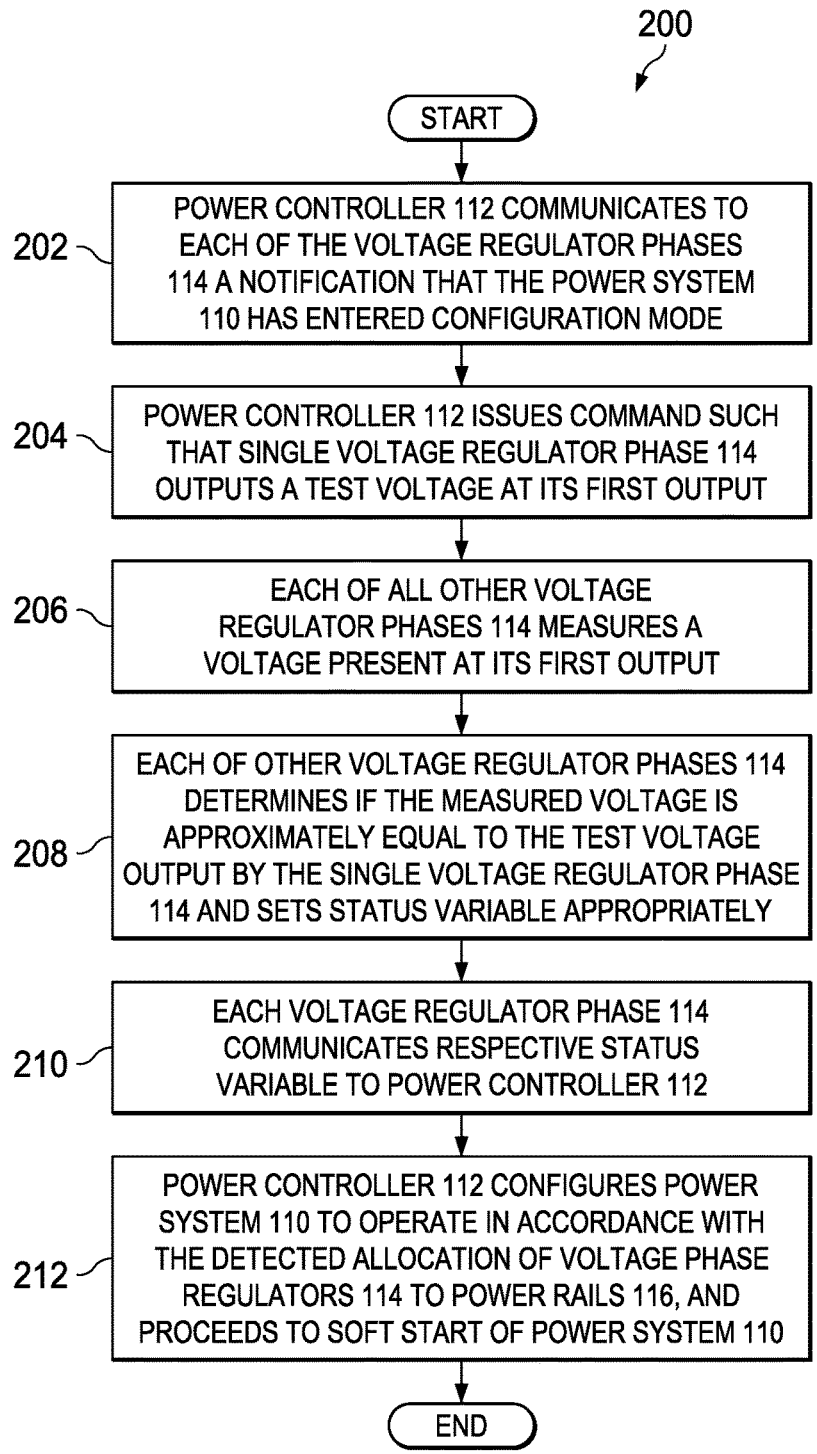
FIG. 2 illustrates a flow chart of an example method for configuring a voltage phase regulator allocation, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, power supplies, air movers (e.g., fans and blowers) and/or any other components and/or elements of an information handling system.

FIG. 1 illustrates a block diagram of an example of an information handling system 102. In some embodiments, information handling system 102 may comprise a personal computer. In some embodiments, information handling system 102 may comprise or be an integral part of a server. In other embodiments, information handling system 102 may comprise a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a basic input/output system (BIOS) 105 communicatively coupled to processor 103, a management controller 106 communicatively coupled to processor 103, a power system 110, a primary power rail 116a for supplying power to one or more information handling resources of information handling system 102, and a secondary power rail 116b for supplying power to one or more information handling resources of information handling system 102. Primary power rail 116a and secondary power rail 116b may be referred to individually as a power rail 116 or collectively as power rails 116.

Processor 103 may comprise any system, device, or apparatus operable to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off.

A BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102. In some embodiments, BIOS 105 may also be configured to facilitate configuration of allocation of voltage regulator phases of power system 110 between power rails 116, as described in greater detail below.

Management controller 106 may be configured to provide out-of-band management facilities for management of information handling system 102. Such management may be made by management controller 106 even if a host system of information handling system 102 is powered off or powered to a standby state. Management controller 106 may include a processor, memory, an out-of-band network interface separate from and physically isolated from an in-band network interface of information handling system 102, and/or other embedded information handling resources. In certain embodiments, management controller 106 may include or may be an integral part of a baseboard management controller (BMC) or a remote access controller (e.g., a Dell Remote Access Controller or Integrated Dell Remote Access Controller). In other embodiments, management controller 106 may include or may be an integral part of a chassis management controller (CMC). In some embodiments, management controller 106 may be configured to communicate with power system 110 in order to facilitate configuration of allocation of voltage regulator phases of power system 110 between power rails 116, as described in greater detail below.

Power system 110 may include a power controller 112, a plurality of voltage regulator phases 114, a plurality of phase output inductor footprint locations 118 (e.g., phase output inductor footprint locations 118a and 118b) associated with each of the plurality of voltage regulator phases 114, and a plurality of output inductors 120 such that for each voltage regulator phase 114, an output inductor 120 is populated in one of its associated phase output inductor footprint locations 118. Power controller 112 may include any system, device, or apparatus configured to control the output of power system 110, selectively enable and disable voltage regulator phases 114, and/or detect an allocation of phases 114 between power rails 116 and configure power system 110 in accordance with such allocation.

Each voltage regulator phase 114 may include any system, device, or apparatus configured to supply a portion of the total current output of power system 110. In embodiments in which power system 110 is a multi-phase voltage regulator, a voltage regulator phase 114 may comprise a phase of the voltage regulator. Accordingly, power controller 112 may selectively enable and disable one or more voltage regulator phases 114 in response to an electrical current requirement of information handling resources, such that one or more phases may be shed to reduce power consumption of power system 110 in response to the reduced current requirement, and thus increase power efficiency of information handling system 102.

As shown in FIG. 1 and discussed elsewhere herein, each voltage regulator phase 114 may be selectively allocable between primary power rail 116a and secondary power rail 116b based on which of the plurality of phase output inductor footprint locations 118 associated with the voltage regulator phase is populated with an output inductor 120. For example, if a phase output inductor footprint location 118a at the output of a voltage regulator phase 114 is populated with an output inductor 120, such voltage regulator phase 114 may be allocated to primary power rail 116a. On the other hand, if a phase output inductor footprint location 118b at the output of a voltage regulator phase 114 is populated with an output inductor 120, such voltage regulator phase 114 may be allocated to secondary power rail 116b.

Each of primary power rail 116a and secondary power rail 116b may be capable of supplying power to information handling resources of information handling system 102. For example, in some embodiments, processor 103 may comprise or be part of a multichip package that combines a processing core requiring one regulated voltage supply with an integrated non-core package (e.g., a field programmable gate array or "FPGA," integrated graphics chip, or other integrated package) requiring another regulated voltage supply. In such embodiments, the processing core may be powered from primary power rail 116a while the non-core chip may be powered from secondary power rail 116b. As another example, memory 104 may be implemented using different types of memory modules wherein each type requires a different regulated voltage, with primary power rail 116a providing one of such regulated supply voltages and secondary power rail 116b providing another regulated supply voltage.

A phase output inductor footprint location 118a may comprise two terminals comprising a first terminal and a second terminal, and may be coupled at its first terminal to a first output of a corresponding voltage regulator phase 114, coupled at its second terminal to primary power rail 116a, and configured to receive an output inductor 120 between its two terminals such that if such phase output inductor footprint location 118a is populated with an output inductor 120, such output inductor 120 couples the first output of the corresponding voltage regulator phase 114 to primary power rail 116a. Similarly, a phase output inductor footprint location 118b may comprise two terminals comprising a first terminal and a second terminal, and may be coupled at its first terminal to a second output of a corresponding voltage regulator phase 114, coupled at its second terminal to secondary power rail 116b, and configured to receive an output inductor 120 between its two terminals such that if such phase output inductor footprint location 118b is populated with an output inductor 120, such output inductor 120 couples the second output of the corresponding voltage regulator phase 114 to secondary power rail 116b.

An output inductor 120 may comprise any passive two-terminal electrical component which resists changes in electric current passing through in accordance with Lenz's law, such that a voltage across the terminals of such electrical component is approximately equal to an inductance of the inductor multiplied by the rate of change with respect to time of a current passing through such electrical component.

During assembly (e.g., motherboard assembly) of information handling system 102, the outputs of each voltage regulator phase 114 may be populated with an output inductor 120 in one of its corresponding phase output inductor footprint locations 118. Thus, for example, if information handling system 102 includes only primary power rail 116a and not secondary power rail 116b, all output inductors 120 may be populated only in phase output inductor footprint locations 118a. On the other hand, if information handling system 102 includes primary power rail 116a and secondary power rail 116b, one or more output inductors 120 may be populated phase output inductor footprint locations 118a and one or more output inductors 120 may be populated phase output inductor footprint locations 118b, such that each power rail 116 is coupled to a number of voltage regulator phases 114 necessary to provide the expected electrical requirements of each power rail 116.

During initialization (e.g., power on, boot, etc.) of information handling system 102, power controller 112 may detect the allocation of voltage regulator phases 114 to power rails 116 based on the population of output inductors 120 in output inductor footprint locations 118 and configure power system 110 to operate in accordance with such allocation. An example method to determine population of output inductors 120 in output inductor footprint locations 118 is described below in reference to FIG. 2.

In addition to processor 103, memory 104, BIOS 105, management controller 106, power system 110, and power rails 116, information handling system 102 may include one or more other information handling resources. For example, in some embodiments, information handling system 102 may include more than two power rails 116. In these and other embodiments, power system 110 may include greater or fewer voltage regulator phases 114 than that depicted in FIG. 1.

FIG. 2 illustrates a flow chart of an example method 200 for a configuration mode of power system 110 for determining an allocation of voltage phase regulators 114 to power rails 116, in accordance with embodiments of the present disclosure. According to some embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, during initialization of information handling system 102 (e.g., a portion of the power up or boot process occurring prior to a "soft start" of voltage regulator phases 114) the configuration mode may start and power controller 112 may communicate to each of the voltage regulator phases 114 a notification that the power system 110 has entered such configuration mode.

At step 204, power controller 112 may issue a command such that a single voltage regulator phase 114 outputs a test voltage at its first output (e.g., the output of the voltage regulator phase voltage regulator phase 114 coupled to phase output inductor footprint location 118a associated with the voltage regulator phase 114). In some embodiments, such voltage may be significantly less than that output during steady-state operation of such voltage regulator phase 114 but of sufficient magnitude to be detected by other voltage regulator phases 114 (e.g., 100 millivolts).

At step 206, after the single voltage regulator phase 114 has generated a voltage regulated test voltage, each of all other voltage regulator phases 114 may measure a voltage present at its first output (e.g., the output of the voltage regulator phase voltage regulator phase 114 coupled to phase output inductor footprint location 118a associated with the voltage regulator phase 114).

At step 208, each of the other voltage regulator phases 114 may determine if the measured voltage is approximately equal to the test voltage output by the single voltage regulator phase 114. If the measured voltage is approximately equal to the test voltage output by the single voltage regulator phase 114, such voltage regulator phase 114 may set a status variable associated with such voltage regulator phase 114 indicating that such voltage regulator phase 114 is coupled to primary power rail 116a. On the other hand, if the measured voltage is significantly less than the test voltage output by the single voltage regulator phase 114, such voltage regulator phase 114 may set a status variable associated with such voltage regulator phase 114 indicating that such voltage regulator phase 114 is not coupled to primary power rail 116a (or, in the case of only two power rails 116, such variable may also indicate that such voltage regulator phase 114 is not coupled to secondary power rail 116b).

At step 210, each voltage regulator phase 114 may communicate its respective status variable to power controller 112. At step 212, power controller 112 may configure power system 110 to operate in accordance with the detected allocation of voltage phase regulators 114 to power rails 116, and proceed to soft start of power system 110. After completion of step 212, method 200 may end.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

Although method 200 as described above contemplates determining an allocation when only no more than two power rails 116 may be present in a power system, in the more general case in which more than two power rails 116 may be supported, power controller 112 may cause each voltage regulator phase 114 to sequentially apply a test voltage to its outputs and measure the voltage response thereto at the outputs of each of the other voltage regulator phases 114 to determine connectivity between voltage regulator phases 114 and rails 116. In these and other embodiments, power controller 112 may cause the various voltage regulator phases 114 to apply test voltages of different magnitudes, so as to be able to uniquely determine connectivity of other voltage regulator phases 114 and facilitate error isolation (e.g., in which a voltage regulator phase 114 is inadvertently coupled to multiple output rails 116).

As contemplated above, power controller 112 may be configured to communicate with each voltage regulator phase 114 (e.g., communication of notifications regarding power system 110 existing in the configuration mode, communication of commands to generate a test voltage, etc.) and each voltage regulator phase 114 may be configured to communicate with power controller 112 (e.g., communication of status variables from voltage regulator phases 114 to power controller 112). Such communication may be made in any suitable manner. For example, in some embodiments, power controller 112 and voltage regulator phases 114 may be coupled via a communications bus (e.g., a System Management Bus, a Power Management Bus, an Inter-Integrated Circuit Bus, etc.). As another example, in other embodiments, such communication may be made by leveraging existing communications pathways between power controller 112 and voltage regulator phases 114 that may be required during steady state operation of power system 110, but not otherwise needed during the configuration mode. Specific examples of such communication pathways may include pathways for communicating existence of a fault of a voltage regulator phase 114 from such voltage regulator phase 114 to power controller 112, a unique identifier of a voltage regulator phase 114 fault from such voltage regulator phase 114 to power controller 112, a temperature of a voltage regulator phase 114 from such voltage regulator phase 114 to power controller 112, another parameter temperature of a voltage regulator phase 114 from such voltage regulator phase 114 to power controller 112, a pulse width modulation signal from power controller 112 to a voltage regulator phase 114, or any other suitable pathway not needed for other operations of power system 110 during the configuration mode.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
   a processor; and
   a power system comprising:
   a plurality of voltage regulator phases, wherein each of the plurality of voltage regulator phases comprises at least two outputs comprising a first output and a second output;
   a plurality of first phase output inductor footprint locations, wherein each of the plurality of first phase output inductor footprint locations is respectively coupled to the first output of a respective voltage regulator phase of the plurality of voltage regulator phases and is coupled to a primary power rail of the information handling system such that when populated with a respective output inductor, such first phase output inductor footprint location electrically couples the first output of the respective voltage regulator phase to the primary power rail;
   a plurality of second phase output inductor footprint locations, wherein each of the plurality of second phase output inductor footprint locations is respectively coupled to the second output of a respective voltage regulator phase of the plurality of voltage regulator phases and is coupled to a secondary power rail of the information handling system such that when populated with a respective output inductor, such second phase output inductor footprint location electrically couples the second output of the respective voltage regulator phase to the secondary power rail; and
   a power controller configured to, during a configuration mode of the power system, and based on population of output inductors in the first phase output inductor footprint locations and second phase output inductor footprint locations, determine connectivity between the plurality of voltage regulator phases and the primary power rail and connectivity between the plurality of voltage regulator phases and the secondary power rail.

2. The information handling system of claim 1, wherein the power controller is further configured to configure the power system for operation based on connectivity between the plurality of voltage regulator phases and the primary power rail and connectivity between the plurality of voltage regulator phases and the secondary power rail.

3. The information handling system of claim 1, wherein the power controller is configured to determine connectivity between the plurality of voltage regulator phases and the primary power rail and connectivity between the plurality of voltage regulator phases and the secondary power rail at least by causing application of a test voltage to a first output of one of the voltage regulator phases having the first phase output inductor footprint location coupled thereto populated with an output inductor and receiving a plurality of status variables of the other voltage regulator phases of the plurality of voltage regulator phases indicating whether their first outputs are coupled to respective first phase output inductor footprint locations populated with output inductors.

4. The information handling system of claim 1, wherein each of the plurality of voltage regulator phases is configured to:
   in response to a test voltage applied to a first output or a second output of another voltage regulator phase, determine whether such voltage regulator phase is coupled to one of the primary power rail or the secondary power rail; and communicate a status variable indicative of whether such voltage regulator phase is coupled to one of the primary power rail or the secondary power rail.

5. The information handling system of claim 4, wherein each of the plurality of voltage regulator phases is configured to determine whether such voltage regulator phase is coupled to one of the primary power rail or the secondary power rail by measuring a voltage of at least one of the first output and the second output of such voltage regulator phase in response to the test voltage.

6. The information handling system of claim 4, wherein each of the plurality of voltage regulator phases is configured to communicate the status variable indicative of whether such voltage regulator phase is coupled to one of the primary power rail or the secondary power rail via a communication pathway used during steady-state operation of the power system but not otherwise utilized during the configuration mode of the power system.

7. A method comprising, in an information handling system comprising a power system having a plurality of voltage regulator phases:

during a configuration mode of the power system, determining connectivity between the plurality of voltage regulator phases and a primary power rail and connectivity between the plurality of voltage regulator phases and a secondary power rail based on population of:

output inductors in one or more of a plurality of first phase output inductor footprint locations wherein each of the plurality of first phase output inductor footprint locations is respectively coupled to a first output of a respective voltage regulator phase of the plurality of voltage regulator phases and is coupled to a primary power rail of the information handling system such that when populated with a respective output inductor, such first phase output inductor footprint location electrically couples the first output of the respective voltage regulator phase to the primary power rail; and output inductors in one or more of a plurality of second phase output inductor footprint locations wherein each of the plurality of second phase output inductor footprint locations is respectively coupled to a second output of a respective voltage regulator phase of the plurality of voltage regulator phases and is coupled to a secondary power rail of the information handling system such that when populated with a respective output inductor, such second phase output inductor footprint location electrically couples the second output of the respective voltage regulator phase to the secondary power rail.

8. The method of claim 7, further comprising configuring the power system for operation based on connectivity between the plurality of voltage regulator phases and the primary power rail and connectivity between the plurality of voltage regulator phases and the secondary power rail.

9. The method of claim 7, further comprising determining connectivity between the plurality of voltage regulator phases and the primary power rail and connectivity between the plurality of voltage regulator phases and the secondary power rail at least by causing application of a test voltage to a first output of one of the voltage regulator phases having the first phase output inductor footprint location coupled thereto populated with an output inductor and receiving a plurality of status variables from the other voltage regulator phases of the plurality of voltage regulator phases indicating whether their first outputs are coupled to respective first phase output inductor footprint locations populated with output inductors.

10. The method of claim 7, further comprising, by each of the plurality of voltage regulator phases:

in response to a test voltage applied to a first output or a second output of another voltage regulator phase, determining whether such voltage regulator phase is coupled to one of the primary power rail or the secondary power rail; and communicating a status variable indicative of whether such voltage regulator phase is coupled to one of the primary power rail or the secondary power rail.

11. The method of claim 10, further comprising, by each of the plurality of voltage regulator phases, determining whether such voltage regulator phase is coupled to one of the primary power rail or the secondary power rail by measuring a voltage of at least one of the first output and the second output of such voltage regulator phase in response to the test voltage.

12. The method of claim 10, further comprising, by each of the plurality of voltage regulator phases, communicating the status variable indicative of whether such voltage regulator phase is coupled to one of the primary power rail or the secondary power rail via a communication pathway used during steady-state operation of the power system but not otherwise utilized during the configuration mode of the power system.

13. A power system comprising:

a plurality of voltage regulator phases, wherein each of the plurality of voltage regulator phases comprises at least two outputs comprising a first output and a second output;

a plurality of first phase output inductor footprint locations, wherein each of the plurality of first phase output inductor footprint locations is respectively coupled to the first output of a respective voltage regulator phase of the plurality of voltage regulator phases and is coupled to a primary power rail such that when populated with a respective output inductor, such first phase output inductor footprint location electrically couples the first output of the respective voltage regulator phase to the primary power rail;

a plurality of second phase output inductor footprint locations, wherein each of the plurality of second phase output inductor footprint locations is respectively coupled to the second output of a respective voltage regulator phase of the plurality of voltage regulator phases and is coupled to a secondary power rail such that when populated with a respective output inductor, such second phase output inductor footprint location electrically couples the second output of the respective voltage regulator phase to the secondary power rail; and a power controller configured to, during a configuration mode of the power system, and based on population of output inductors in the first phase output inductor footprint locations and second phase output inductor footprint locations, determine connectivity between the plurality of voltage regulator phases and the primary power rail and connectivity between the plurality of voltage regulator phases and the secondary power rail.

14. The power system of claim 13, wherein the power controller is further configured to configure the power system for operation based on connectivity between the plurality of voltage regulator phases and the primary power rail and connectivity between the plurality of voltage regulator phases and the secondary power rail.

15. The power system of claim 13, wherein the power controller is configured to determine connectivity between the plurality of voltage regulator phases and the primary power rail and connectivity between the plurality of voltage regulator phases and the secondary power rail at least by causing application of a test voltage to a first output of one of the voltage regulator phases having the first phase output inductor footprint location coupled thereto populated with an output inductor and receiving a plurality of status variables of the other voltage regulator phases of the plurality of voltage regulator phases indicating whether their first outputs are coupled to respective first phase output inductor footprint locations populated with output inductors.

16. The power system of claim 13, wherein each of the plurality of voltage regulator phases is configured to:
 in response to a test voltage applied to a first output or a second output of another voltage regulator phase, determine whether such voltage regulator phase is coupled to one of the primary power rail or the secondary power rail; and
 communicate a status variable indicative of whether such voltage regulator phase is coupled to one of the primary power rail or the secondary power rail.

17. The power system of claim 16, wherein each of the plurality of voltage regulator phases is configured to determine whether such voltage regulator phase is coupled to one of the primary power rail or the secondary power rail by measuring a voltage of at least one of the first output and the second output of such voltage regulator phase in response to the test voltage.

18. The power system of claim 16, wherein each of the plurality of voltage regulator phases is configured to communicate the status variable indicative of whether such voltage regulator phase is coupled to one of the primary power rail or the secondary power rail via a communication pathway used during steady-state operation of the power system but not otherwise utilized during the configuration mode of the power system.

* * * * *